United States Patent [19]

Levy et al.

[11] Patent Number: 5,378,892
[45] Date of Patent: Jan. 3, 1995

[54] ANGLE FILTER FOR USE IN AN INFRARED OPTICAL SYSTEM

[75] Inventors: Alvin J. Levy, Orlando; Allan J. Lyon, Apopka, both of Fla.

[73] Assignee: Martin Marietta Corporation, Bethesda, Md.

[21] Appl. No.: 589,791

[22] Filed: Sep. 28, 1990

[51] Int. Cl.6 .................................................. G01J 1/00
[52] U.S. Cl. ..................................... 250/352; 250/353; 250/370.15
[58] Field of Search .................... 250/352, 353, 370.15

[56] References Cited

U.S. PATENT DOCUMENTS

| 2,873,381 | 2/1959 | Lauroesch | 250/236 |
|---|---|---|---|
| 3,165,749 | 1/1965 | Cushner | 343/911 |
| 3,293,437 | 12/1966 | Botdell | 250/83.3 |
| 3,899,145 | 8/1975 | Stephenson | 244/3.13 |
| 3,927,254 | 12/1975 | Lessman | 178/7.1 |
| 4,024,392 | 5/1977 | Teppo et al. | 250/216 |
| 4,052,616 | 10/1977 | Keller | 250/353 |
| 4,087,061 | 5/1978 | Burt | 244/3.16 |
| 4,155,521 | 5/1979 | Evans et al. | 244/3.16 |
| 4,231,534 | 11/1980 | Lintell et al. | 244/3.16 |
| 4,314,255 | 2/1982 | Kornbau | 343/909 |
| 4,421,985 | 12/1983 | Billingsley et al. | 250/352 X |
| 4,431,917 | 2/1984 | Gibbons | 250/352 X |
| 4,446,372 | 5/1984 | Gurnee | 250/334 |
| 4,609,820 | 9/1986 | Miyamoto | 250/352 X |
| 4,738,535 | 4/1988 | Webster | 356/418 |
| 4,804,884 | 2/1989 | Vriens et al. | 313/474 |
| 4,854,670 | 8/1989 | Mellor | 350/166 |
| 4,859,030 | 8/1989 | Rotier | 350/174 |
| 4,914,299 | 4/1990 | Jungkman et al. | 250/352 |
| 4,987,305 | 1/1991 | Bornstein et al. | 250/352 |

Primary Examiner—Stephen C. Buczinski
Attorney, Agent, or Firm—Burns, Doane, Swecker & Mathis

[57] ABSTRACT

An angle filter for restricting the range of light received by a detector functions as a "cold shield" in an infrared optical system. The angle filter either utilizes fiber optics or a thin film technology and reduces the size of an optical system operating in the infrared region while maintaining high system performance. The cold shield/exit pupil configuration of a traditional optical system is replaced by the angle filter.

23 Claims, 4 Drawing Sheets

ANGLE FILTER FOR USE IN AN INFRARED OPTICAL SYSTEM

BACKGROUND OF THE INVENTION

1. Field of the Invention

This invention relates to a cold shield for use in an infrared optical system and, more particularly, to the use of optical fibers or the use of a thin film angle filter to function as a cold shield in an infrared optical imaging system such as an electro-optic seeker system.

2. Description of Related Art

Infrared optical systems using high performance semiconductor detector materials usually require cryogenic cooling in order to increase detector sensitivity. The detectors are typically cooled to a temperature of approximately 77° Kelvin by liquid nitrogen. In these systems, optimum performance is achieved by "cold shielding" the detector array by introducing a cold diaphragm in front of the detector array so that the viewing angle of the detector to the warm background is limited as far as possible to that required for transmission of the radiation from the scene. The cold diaphragm is typically cooled to a temperature (e.g., 80° Kelvin) close to that of the detector. Since the radiation reaching the detector array from outside this viewing angle is emitted from the cold diaphragm, it is generally negligible so that the condition of minimum background radiation, and, hence, minimum background noise, is achieved. In other words, cold shielding of a detector array is typically achieved with a cryogenically cooled diaphragm or aperture stop in front of the cryogenically cooled detector array. The cold shield diaphragm and detector are placed within a Dewar, a vessel in which they are cryogenically cooled.

FIG. 1 presents a seeker configuration known to the assignee of the present application. The seeker configuration includes a dome 10 and a three element optical system 7 comprising three lenses 11, 13, and 15 particularly adapted for transmitting and focussing infrared radiation. The seeker configuration further includes a Dewar window 18 and an aperture stop 19. The aperture stop 19 acts as the cold shield in this embodiment. A cold filter 21 is positioned between the aperture stop 19 and the focal plane 22. A solid state infrared detector array (not shown) is typically positioned at the focal plane 22. This seeker configuration provides approximately 100 percent cold shielding with a moderate aperture.

Note that, in the seeker configuration of FIG. 1, the optical aperture is smaller than the aperture A of the first imaging element of the optical system after the dome 10. Therefore, the seeker configuration is not optimal.

In one application, the dome 10 forms the nose of a guided projectile or missile. However, the system of FIG. 1 is too large for smaller projectile/missile systems. The aperture may be reduced by utilizing an optical configuration which incorporates optical relay elements. Optical relay elements tend to place the entrance pupil at the front element when the system aperture is at the cold shield location in the Dewar. Unfortunately, this system is too long and complex to be practical for use in small missiles or guided projectiles.

Therefore, it is desirable to provide an electro-optic infrared seeker system with high sensitivity while maintaining a small package size. Two system parameters must be optimized to provide this goal; 1) optical aperture and 2) efficient detector cold shielding or cold stop. Prior to the present invention, it was necessary to accept undesirable compromises in sensor performance by reducing the required size of the optical system.

SUMMARY OF THE INVENTION

One object of the present invention is to reduce the size of the infrared optical system while maintaining high system performance.

Another object of the present invention is to package an infrared optical system in a small space so that it can be utilized in guided projectile and missile environments.

It is another object of the invention to provide an optical system capable of accommodating a larger aperture in a given package size.

It is yet another object of the invention to provide an infrared optical system that has a more compact method of cold shielding.

These and other objects are fulfilled by the present invention which is an infrared optical system including imaging optics for transmitting and focusing infrared light from object space onto an image plane, an infrared light detector positioned closely proximate to the image plane, a Dewar for cryogenically cooling the detector and an angle filter for restricting the field of view of the detector to a predetermined angle. The angle filter of the present invention replaces the conventional cold shield and exit pupil configuration of previous infrared optical systems.

In one preferred embodiment of the invention, the cold shield and exit pupil configuration is replaced by a fiber optic angle restricting filter which functions to substantially limit the viewing angle of the infrared detector array.

In another embodiment of the invention, the angle restricting filter is a thin film and substrate stack on the front of the substrate cold filter.

The angle restricting filters may be curved to keep the center of the ray columns converging on the detector normal to the surface of the cold filter.

The present invention keeps the entrance pupil close to or at the front surface of the optical system for optimum aperture size while maintaining good cold shielding without complex optical configurations. In the seeker configuration, a fiber optic package is attached to the IR detector. Each picture element (pixel) has a fiber optic strand attached to it. The other end of the fiber is at the focal plane of the imaging optics. The optical fibers are configured to allow a maximum angle of radiation to enter it corresponding to the required f/number or numerical aperture of the optical system. Cold shielding is thus provided for each pixel. The fibers are configured to allow for skewing of the optical bundles as the object point moves off axis. This is done by configuring the optical system and the fibers to provide for the chief ray to be normal to the end of each fiber.

The detector array may be either a three-dimensional array consisting of a plurality of individual detector areas configured in columns and rows or a two-dimensional detector array wherein the individual detector areas are aligned in a row.

BRIEF DESCRIPTION OF THE DRAWINGS

The preferred embodiments of the present invention will now be described by way of example with refer

DESCRIPTION OF THE PREFERRED EMBODIMENTS

For purposes of this disclosure, the term "cold shield" will continue to be used to describe the optical element used to limit the effect of background thermal radiation on the detector. The term "cold shield" is interchangeable with the term "angle restricting filter" or "angle filter device" hereinafter.

Figure 1:
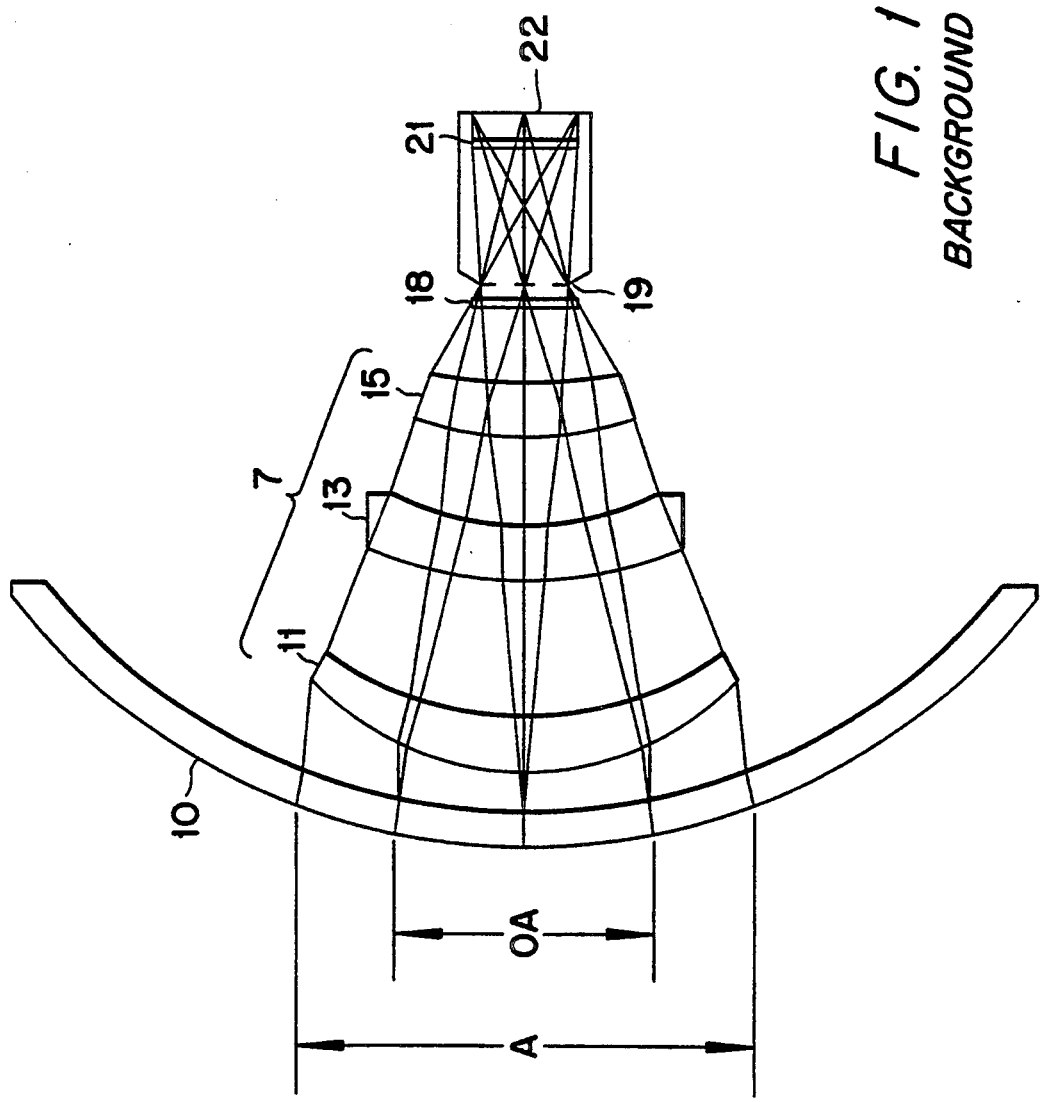
- FIG. 1 is an optical diagram of an infrared optical system upon which the present invention improves.
Figure 2:
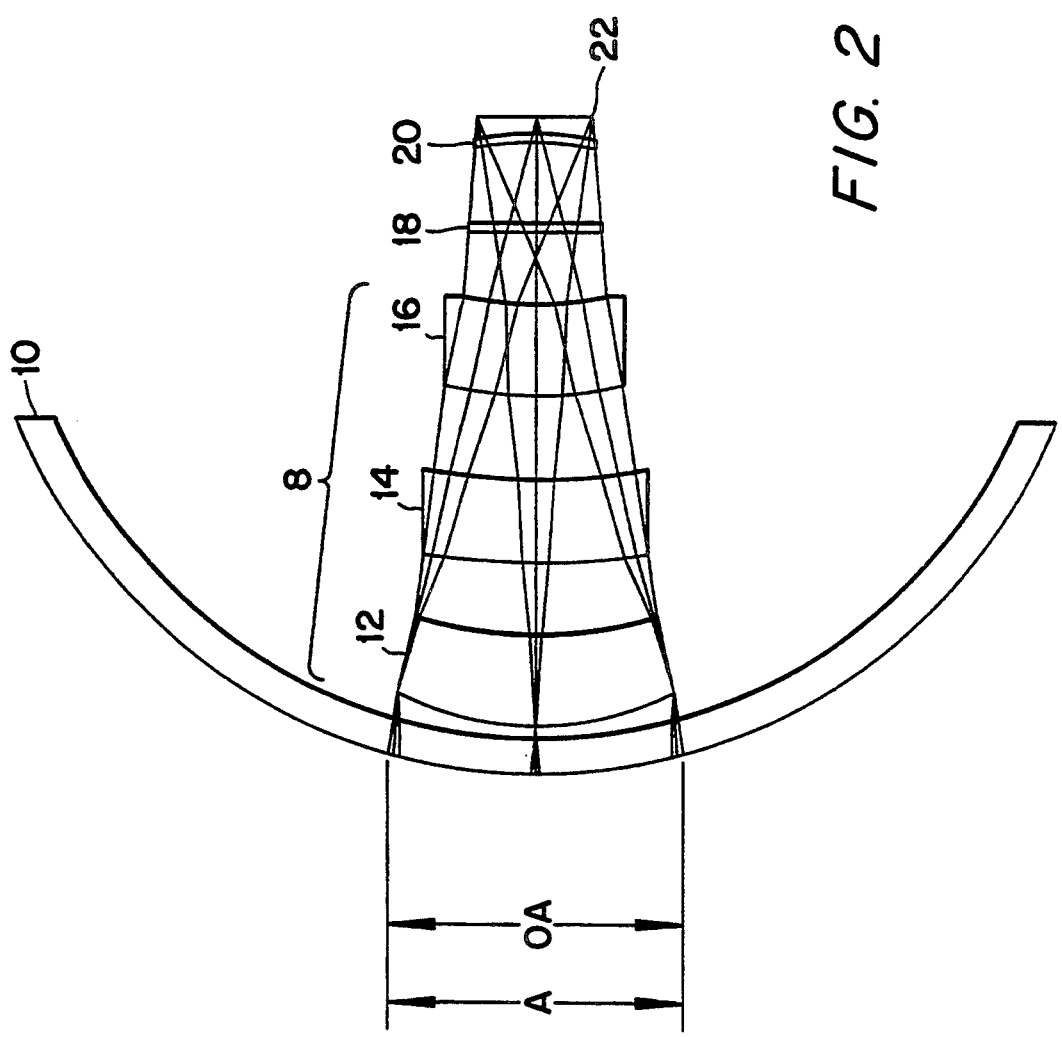
FIG. 2 is an optical diagram of one preferred embodiment of the present invention.

The infrared optical system shown in FIG. 2 includes a dome 10 which may form the exterior surface of the nose of a missile or projectile, for instance. Behind the dome 10 are three optical elements 12, 14, and 16 which form a three-element optical set 8 for gathering and focusing infrared radiation from the object space. The three-element optical set 8 has a predefined optical aperture OA which is substantially equivalent to the aperture A of the first optical element 12 thereby optimizing the aperture size. Behind the three-element optical set 8 is a window 18 which is substantially transparent to infrared radiation and forms a barrier of the cryogenically cooled vessel, a.k.a. Dewar, (partially shown) which houses the cold filter/cold shield 20, and the infrared detector array 26 (shown in FIG. 3). Naturally, the optical elements are made of materials having substantial transmission in the infrared light range, such as geranium, silicon, zinc sulfide, etc. Many optical configurations may be used without departing from the spirit or scope of the present invention.

Figure 3:
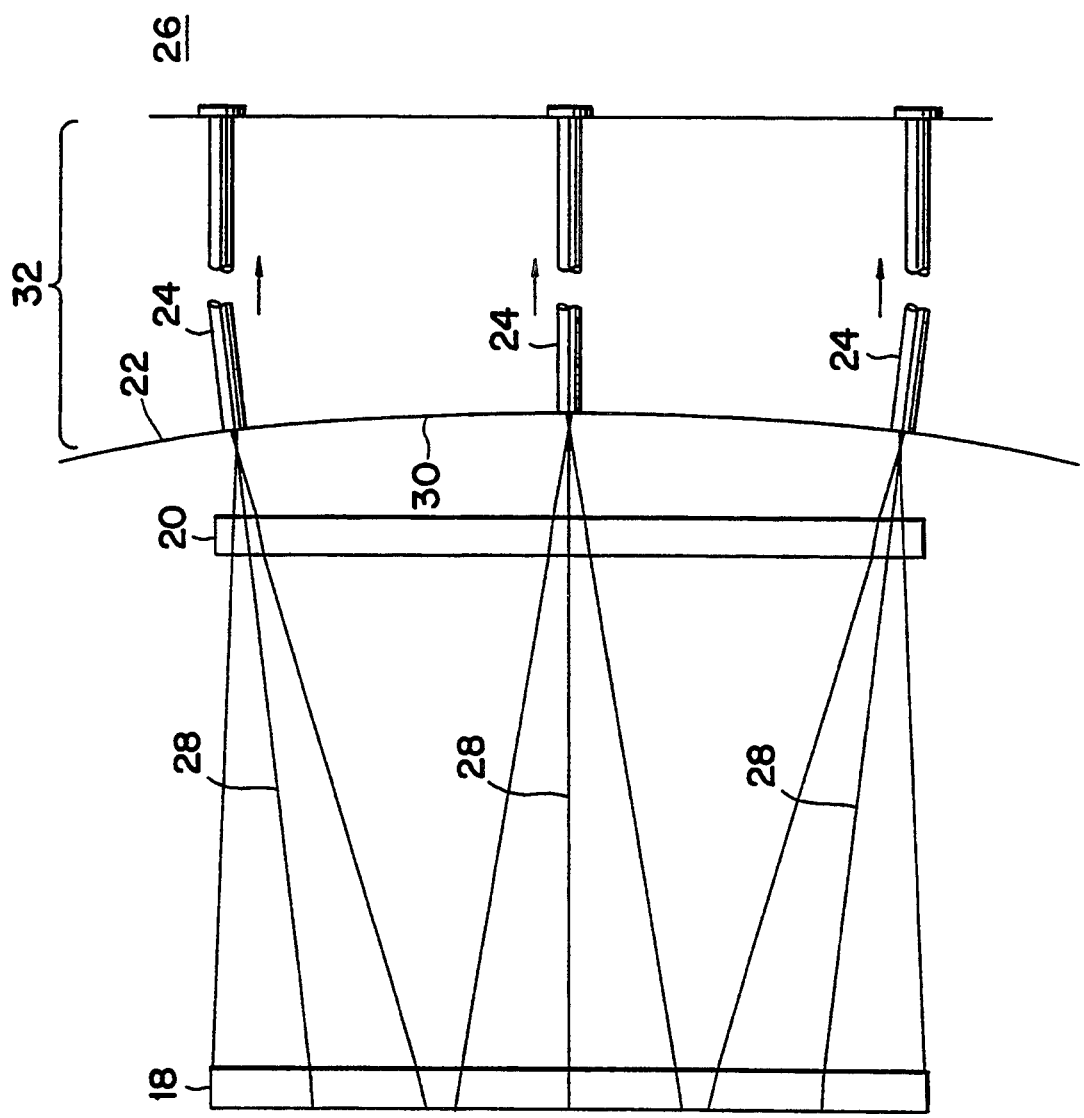
FIG. 3 is a first preferred embodiment of the angle filter device shown in FIG. 2 using a fiber optic package.

FIG. 3 is a detailed perspective of the Dewar and its contents. The Dewar window 18 allows infrared light to pass into the cryogenically cooled vessel to focus an image on concave image plane 22 through the cold filter 20. The image plane 22 corresponds with the light receiving ends of a plurality of optical fibers 24 which forms the angle restricting filter 32. The optical fibers 24 have a high transmission ratio in the infrared spectrum. The light receiving ends of the optical fibers 24 are nodal to the chief rays 28 impinging on the focal plane 22. This creates a concave surface 30 which corresponds to the concave focal plane 22.

The light passing into the optical fibers 24 is transmitted through the optical fibers 24 to the detector array 26. There is at least one optical fiber 24 per picture element (pixel) of the detector array 26. The light emitting ends of the plurality of optical fibers 24 form a substantially planar surface for abutment against the infrared detector 26 at the detector plane. As can be seen in FIG. 3, individual optical fibers are slightly skewed to accommodate the concave front surface 30.

Each optical fiber 24 defines an acceptance cone which is defined as a range of angles of impinging light which will be accepted into the fiber 24 and transmitted along its length. Light impinging on the fiber 24 outside the cone range will either be reflected directly or enter the fiber and not be internally reflected. Thus, the optical fiber angle restricting filter 32 serves the same function as the cryogenically cooled cold shield 19 in that it substantially reduces the effect of background radiation on the detector in an infrared optical system. In the preferred embodiment, the acceptance cone is approximately 18° at an f/number of f/3 and 29° at an f/number of f/2.

In a second preferred embodiment of the present invention, the cold shield is formed by thin film technology. A thin film coating substrate stack restricts the acceptance angle, i.e., permits light to pass only if it impinges on the cold filter within a predetermined range of angles. The thin film/substrate stack is comprised of a set of thin film coatings and low index of refraction optical materials as substrates. The coatings, substrate materials and thicknesses are arranged to manage the incoming angle of incidence to transmit all desired rays and reject all rays having larger than desired incidence angles. A thin film angle filter of this type is manufactured by the Galileo Optical Co. of Sturbridge, Mass. 01566.

Figure 4:
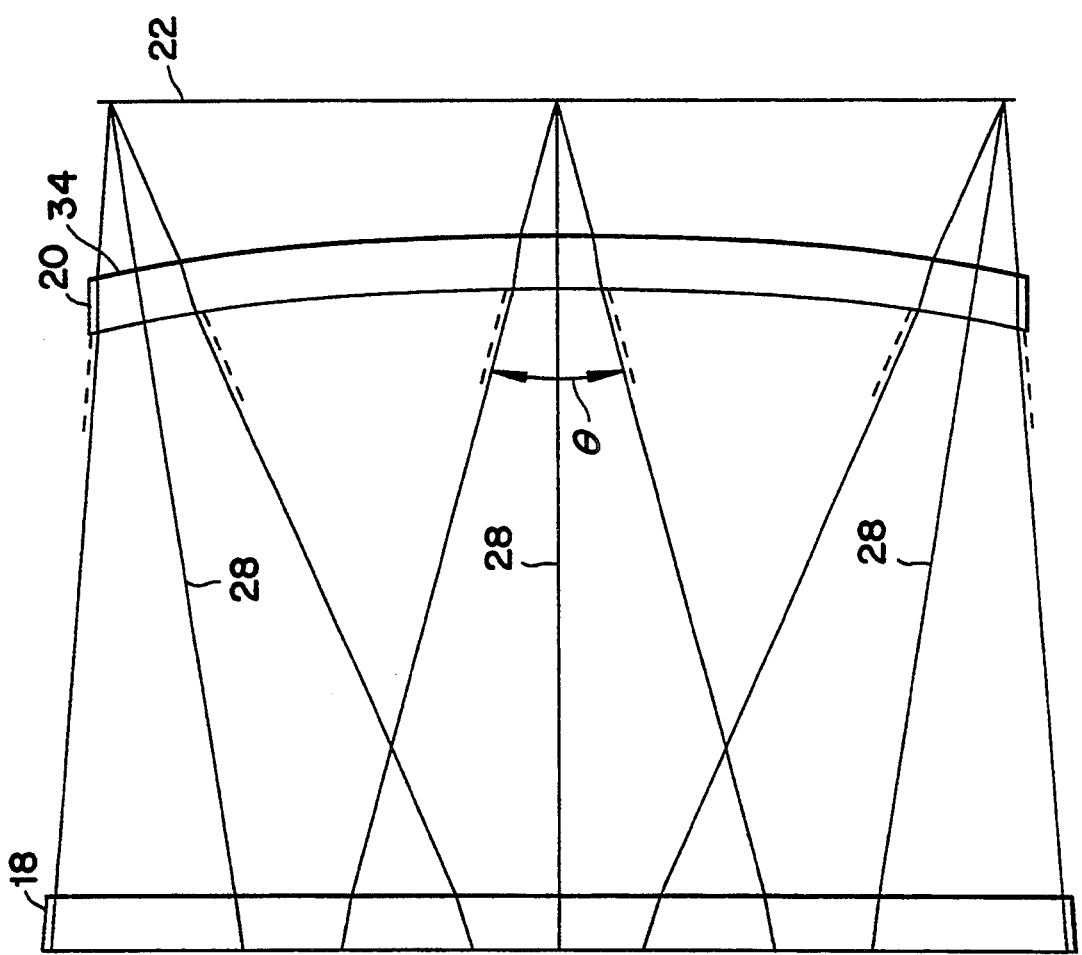
FIG. 4 is a second preferred embodiment of the angle filter device shown in FIG. 2 using thin film technology.

The cold filter 34 (shown in FIG. 4) is incorporated into the cold shield 20 as a thin film coating on the rear of the cold shield substrate. The cold shield 20, and therefore the cold filter 34, is curved to keep the center of the ray cones converging on the cold shield normal to its surface. In other words, the center of its curvature is at the plane of the exit pupil. The cutoff angle of the filter can then be constant regardless of field angle. FIG. 4 graphically illustrates the required filter acceptance angle Θ for the cold shield 20 to accommodate the direction of the chief rays 28 of the impinging light.

While particular constructions of the filter cold shield have been illustrated, it will be obvious to those skilled in the art that the invention may be applied to optical systems of other construction without departing from the principle of operation. The invention may be embodied in many other forms. It is therefore to be understood that the invention is not limited to the specific embodiments thereof which have been discussed above, but the various changes which will now suggest themselves to those skilled in the art may be made in the material, configuration, details of the construction, arrangement of the elements, and applications thereof, without departing from the invention as defined by the appended claims.

What is claimed is:

1. An infrared optical system, comprising:
   imaging optics for transmitting and focusing infrared light from object space onto an image plane;
   an infrared light detector positioned closely proximate to said image plane for detecting said transmitted and focused infrared light;
   a vessel for cryogenically cooling said detector; and
   a thin film angle filter for restricting a range of light received by said detector from said imaging optics to a predetermined angle.

2. An infrared optical system according to claim 1, wherein said angle filter forms a concave surface.

3. An infrared optical system according to claim 2, wherein said infrared light detector is a detector array including a plurality of picture elements formed in columns and rows.

4. An infrared optical system according to claim 2, wherein said infrared light detector is a detector array including a plurality of picture elements formed in a row.

5. An infrared optical system according to claim 1, wherein said imaging optics includes a concave focal plane.

6. An infrared optical system according to claim 1, wherein said imaging optics includes a three element optical set.

7. An infrared optical system according to claim 6, wherein said imaging optics has an aperture of a similar dimension to the aperture of a first one of said three optical elements.

8. A cold shield for use in an infrared optical system, comprising:
   a plurality of optical fibers placed entirely in a cryogenically cooled chamber, each fiber having a first end for receiving light and a second end for emitting light;
   said first ends of said plurality of optical fibers forming a substantially concave surface such that chief rays of said first ends would project to a point in front of said concave surface; and
   said second ends of said plurality of optical fibers forming a substantially flat surface such that chief rays of said second ends are substantially parallel to one another.

9. A cold shield for use in an infrared optical system, comprising:
   a thin film angle filter substrate having a front surface and a rear surface, said substrate being curved to form a concave surface, whereby lines normal to said concave surface meet at an imaginary point in front of said concave surface.

10. A method of imaging infrared radiation comprising the steps of:
    transmitting and focusing infrared light from an object space onto an image plane;
    detecting said transmitted and focused infrared light using a detector;
    cryogenically cooling said detector; and
    restricting a range of light received by said detector from said imaging object to a predetermined angle using a thin film angle filter.

11. The method of claim 10 wherein said transmitted and focused infrared light is detected by a plurality of detector elements and wherein light received by each detector element is restricted to a range of angles.

12. An infrared optical system, comprising:
    imaging optics for transmitting and focusing infrared light from object space onto an image plane;
    an infrared light detector positioned closely proximate to said image plane for detecting said transmitted and focused infrared light;
    a vessel for cryogenically cooling said detector; and
    an angle filter, placed in said cryogenically cooled vessel, for restricting a range of light received by said detector from said imaging optics to a predetermined angle wherein said angle filter includes a plurality of optical fibers each having a first and second end, said first ends forming a substantially concave surface and said second ends forming a substantially flat surface.

13. An infrared optical system according to claim 12, wherein said angle filter forms a concave surface.

14. An infrared optical system according to claim 12, wherein said infrared light detector is a detector array including a plurality of picture elements formed in columns and rows.

15. An infrared optical system according to claim 14, wherein each of said second ends of said plurality of optical fibers is juxtaposed to a single picture element of said array.

16. An infrared optical system according to claim 12, wherein said infrared light detector is a detector array including a plurality of picture elements formed in a row.

17. An infrared optical system according to claim 16, wherein each of said second ends of said plurality of optical fibers is juxtaposed to a single picture element of said array.

18. An infrared optical system according to claim 12, wherein said imaging optics includes a concave focal plane.

19. An infrared optical system according to claim 12, wherein said imaging optics includes a three element optical set.

20. An infrared optical system according to claim 19, wherein said imaging optics has an aperture of a similar dimension to the aperture a first one of said three optical elements.

21. A cold shield for use in an infrared optical system, comprising:
    an angle filter substrate having a front surface and a rear surface, said substrate being curved to form a concave surface, whereby lines normal to said concave surface meet at an imaginary point in front of said concave surface, wherein said substrate comprises a thin film.

22. A method of imaging infrared radiation comprising the steps of:
    transmitting and focusing infrared light from an object space onto an image plane;
    detecting said transmitted and focused infrared light using a detector;
    cryogenically cooling said detector; and
    restricting a range of light received by said detector from said imaging object to a predetermined angle using an angle filter, said entire angle filter being cryogenically cooled, wherein the detected infrared light is restricted by a plurality of optical fibers each having a first and second end, said first ends forming a substantially concave surface and said second ends forming a substantially flat surface.

23. The method of claim 22 wherein said transmitted and focused infrared light is detected by a plurality of detector elements and wherein light received by each detector element is restricted to a range of angles.

* * * * *

UNITED STATES PATENT AND TRADEMARK OFFICE
CERTIFICATE OF CORRECTION

PATENT NO. : 5,378,892
DATED : January 3, 1995
INVENTOR(S) : Alvin J. Levy et al.

It is certified that error appears in the above-indentified patent and that said Letters Patent is hereby corrected as shown below:

Column 3, line 51, delete "nodal" insert --normal--.

Signed and Sealed this

Eighteenth Day of July, 1995

Attest:

BRUCE LEHMAN

*Attesting Officer*   *Commissioner of Patents and Trademarks*